July 8, 1969

M. E. KAMEN 3,453,705

APPARATUS FOR FORMING COMPRESSED
HANDLE-CARRYING SOAP CAKES

Filed July 5, 1966

INVENTOR
MELVIN E. KAMEN
BY
Curtis, Morris & Safford
ATTORNEYS

INVENTOR
MELVIN E. KAMEN
BY
Curtis, Morris + Safford
ATTORNEYS

United States Patent Office 3,453,705
Patented July 8, 1969

3,453,705
APPARATUS FOR FORMING COMPRESSED
HANDLE-CARRYING SOAP CAKES
Melvin E. Kamen, North Bergen, N.J., assignor to Revlon,
Inc., New York, N.Y., a corporation of Delaware
Filed July 5, 1966, Ser. No. 562,607
Int. Cl. C11d 13/16
U.S. Cl. 25—7                                                    7 Claims

ABSTRACT OF THE DISCLOSURE

Apparatus for forming compressed soap cakes having a handle embedded therein, including a slotted shell, first and second die members movable therein, and a clamp-closure adapted to clamp a handle in the slot of said shell and to seal said slot while compressive forces are applied to a soap blank by said die members.

This invention relates to a die for forming a compressed soap cake with a handle embedded therein.

It is old in the practical art to form a soap cake by compression, in a die, with one end of a handle embedded therein, the handle at times being a rope, or a leather or fabric strap, or a strap of other desirable resilient material.

It has been difficult to form such a soap cake of transparent soap because the physical and mechanical characteristics of the soap have a tendency to cause the soap to ooze through the slot of the shell of the die adjacent the handle, with the result that there is a tendency to force the handle from the soap cake or to cause the embedded portion thereof to misalign with the physical center of the face of the cake from which the handle protrudes.

It is an object of the present invention to form a cake of soap, even a transparent cake, with a handle that has a portion thereof embedded in the cake and centered insofar as the said face of the cake is concerned.

It is a further object of the invention to so construct the die that the soap will be prevented from oozing from the die during the final compression of the cake. There will be no tendency for the compressive force to move the embedded portion of the handle from its centralized position or from the cake itself during the final compression of the cake.

It is another object of the invention to form a soap cake of the character above described, in which the strap is held positively in a definite relationship to the compressible soap material and to the die so that the handle will be centered insofar as the said face of the soap is concerned and will be held in such position during the use of the final soap cake with the result that the cake, during use, will wear evenly and will be supported by the handle at the point of utmost wear.

It is a further object of the invention to so construct the die that compressed cakes of various thicknesses may be formed in the die with the handle centered as above described regardless of the thickness of the cake.

It is a further object of the invention to form, from a soap blank, a compressed soap cake in which the handle is sealed under maximum pressure, whereby the portion of the handle within the soap cake is substantially unified with the soap.

In the drawings, which illustrate one form of my invention as applied to a three piece shell die and the method of forming the cake of soap.

Figure 1:
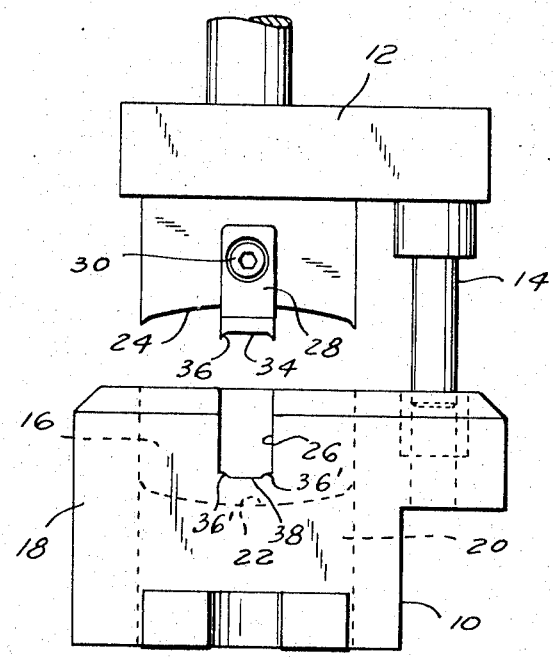
FIGURE 1 is a face view of a die embodying my invention showing the shell and the top die piece in the positions that they will occupy at substantially the time the compression of the blank is initiated.
Figure 1A:
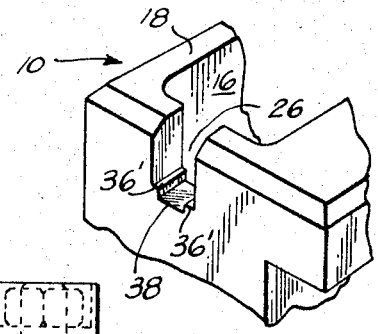
FIGURE 1A is a perspective view of a portion of the shell to show details of a slot formed therein and extending through the shell wall.

The use of my invention comprises the insertion of the end portion of a handle, flexible or otherwise, through a face of and into a soap blank which is substantially uncompressed and preferably has already formed a skin.

I then exert compressive force on the upper and lower faces of the blank and at the same time exert reactive compressive forces on the side faces of the blank until the utmost compression desired is obtained. During the compression of the blank the end portion of the handle within the cake remains in situ with the result that the handle is maintained in its embedded relation to the compressed cake by the full compressive force applied to the blank in the formation of the cake. In other words, the handle and cake are, in effect, unified. The next step resides in the releasing of the compressive force.

This invention is applicable to soaps of various compositions and resulting from various methods of formation, including transparent soaps of various forms and methods of production, for instance, such as referred to in the United States patent to Kelly, 3,155,624, or in "Soap and Chemical Specialties," volume XXXI, No. 6 and No. 7, June and July 1955, by F. W. Wells.

Blanks of transparent soap on which a skin has already formed are nevertheless more gelatinous than those of milled soap until they have been aged, and by aging hardened. The physical condition of such a blank must be taken into consideration if the blank is to be pressed into a cake before the aging has taken place. Of course, it is desirable from a commercial as well as from an esthetic point of view to compress such a cake before it has been aged to hardness. However, with the cake in a gelatinous condition, the soap has tendency to ooze from the die wherever it is possible so to do. For this reason the dies are usually made with very close tolerances.

The use of my invention not only contemplates the sealing of the die at the point where the handle extends through the die, but also the clamping of the handle in an immovable position during the compression of the blank. The result of this is that the soap will not be permitted to ooze from the die at the handle location and the pressure will not be permitted to tend to dislodge the portion of the handle within the cake as it is compressed.

A further advantage flowing from the use of my die resides in the fact that the ultimate cake of soap is not deprived of any of the soap in the cake by an oozing of the soap from the die at the handle, with the result that an esthetic soap may be created and maintained. Furthermore, the face of the soap cake through which the handle extends is free of any protrusion of soap or depression around the location where the handle joins the adjacent face of the cake.

The die of my invention is particularly adapted to commercial and production use, as the ultimate cake with the protruding handle will be of uniform structure and design.

The form of the die that I have illustrated in the drawings includes a female die piece generally indicated by the numeral 10 and a male die piece generally indicated by the numeral 12.

The two die pieces are mounted, during use, in vertical arrangement on a press, the male die piece being supported by and movable with supporting rods 14 which are relatively movable in the female die piece 10.

This die is operated on a press in the usual manner through automatic or pedal operation, the female die piece being rigidly supported on the press. The female die piece is provided with a shell cavity 16 into which the male die enters, the shell cavity being formed by the shell walls 18.

In the cavity 16 a bottom die member 20 having a die face 22, is snugly mounted for vertical upward and downward movements. This bottom die member 20 is supported in its various positions of adjustment by the usual press mechanism and is ejectable from the cavity 16 by said mechanism which is so well known that it need not here be illustrated.

Dies of this general character are well known in the art as are also their operations.

When a material is to be molded between the die face 22 of the die member 20 and the die face 24 of the male die piece, the complete blank is placed in the shell cavity 16 and the upper die piece is forcibly moved against the blank until it is pressed into the form and density desired. If the ultimate product formed from the material is to have faces carrying a design or designs, the die faces 22 and 24 are provided with etching or casting in intaglio or cameo form.

After the compression of the material has been completed, the male die piece is backed off and the bottom die member 20 is raised to eject the product from the shell cavity by the press mechanism.

In order that a cake of soap may be formed in the die from a complete blank, in which cake a handle is securely embedded during the compression of the cake, I have provided one wall of the shell cavity 16 with a slot 26 which extends completely through the wall as shown in FIGURE 1. Thus, when a soap blank with a handle inserted therein and extending therefrom is placed in the shell cavity, the handle will extend outwardly through the slot 26, the bottom die member 20 having been adjusted vertically to a position where, after compression, the soap cake is of the desired thickness. In such an adjustment the handle that extends through the slot 26 rests upon and is centered in the bottom of the slot, with the result that it extends substantially through the center of the adjacent face of the cake.

The male die piece is provided with a clamp-closure plate 28 which is rigid with the male die piece 12 and may be made removable and replaceable through the medium of a screw 30 or similar securing means which attaches it to the male die piece 12.

This clamp-closure plate 28 is adapted to move into the slot upon the lowering of the male die piece 12 until its lower end forcibly clamps the handle to the lower or end face of the slot 26. This occurs prior to the application of the utmost pressure to the soap blank. The clamping action is maintained throughout the subsequent application of pressure so that the handle will extend from substantially the center of the adjacent face of the soap cake and the portion within the cake permanently located by the compressed material so that it becomes, in effect, unified with the cake.

Figure 2:
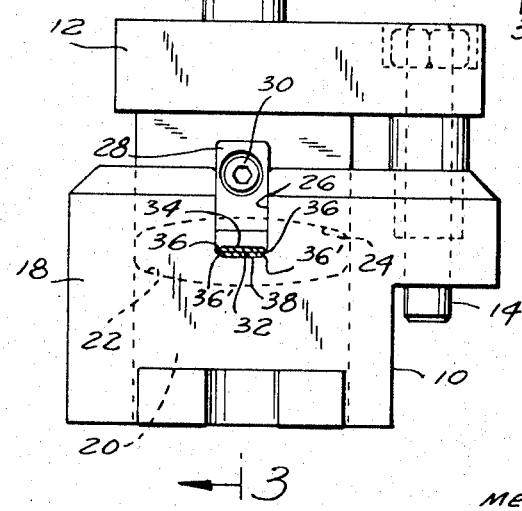
FIGURE 2 is a similar view showing the elements in the positions that they will occupy when the soap has been subjected to its maximum compressive force.
Figure 3:
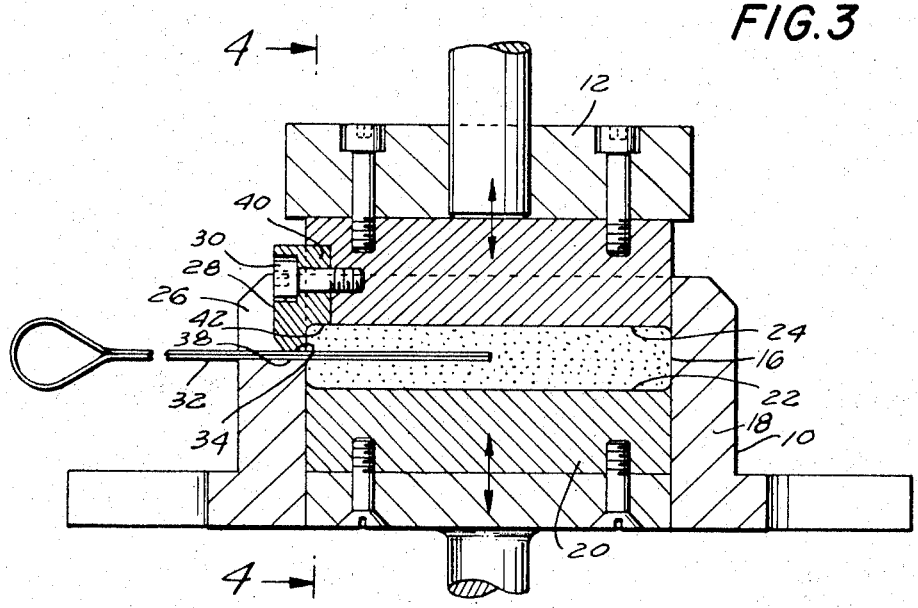
FIGURE 3 is a vertical sectional view on line 3—3 of FIGURE 2.
Figure 4:
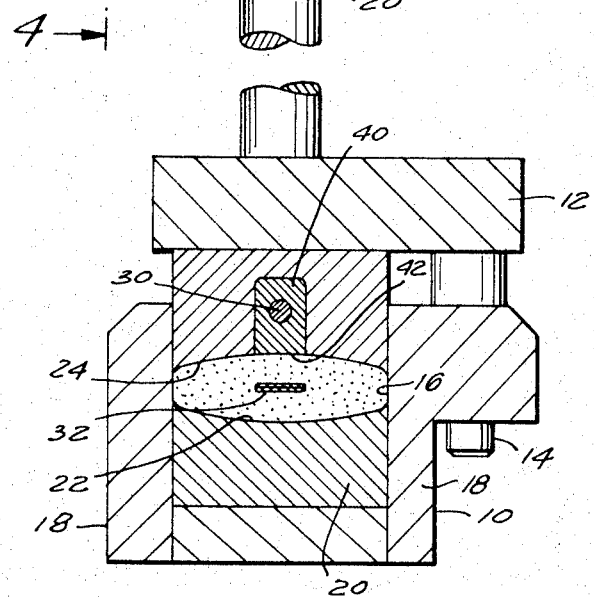
FIGURE 4 is a sectional view on line 4—4 of FIGURE 3.
Figure 5:
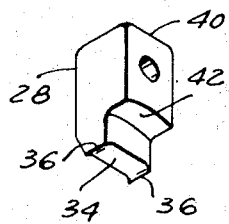
FIGURE 5 is a perspective view of the clamp-closure.

The handle is illustrated in FIGURES 2, 3 and 4 at 32.

It will be noted that the lower end of the clamp-closure plate 28 is provided with a socket 34 for the reception of the handle, which socket is of lesser depth than the thickness of the handle so that it will grip the handle between itself and the bottom of the slot 26. The bottom of slot 26 is recessed at 38 and is provided with anvils 36' against which the projections 36 engage with a compressive force. It is also to be noted that the clamp-closure is provided with laterally arranged side projections 36 which bridge the handle while it is in the slot and thus center it with respect to the slot and the soap blank and ultimately the compressed soap cake.

The clamp closure plate may, of course, be integral with the male die piece if desired, but when it is attached thereto it is provided with a dovetail projection 40 which fits into a recess in the male die piece, and the portion 42 of this clamp-closure is in effect an extension of the face of the top die piece, thus rendering the cavity in the top die piece open only at the face that is opposite the corresponding die face 22.

With this arrangement, the resilient handle is clamped in position in the slot 26 prior to the exertion of any substantial compressive force that is applied to the blank, regardless of the adjustment of the bottom die member 20 to cakes of different thicknesses.

In order that the soap may be prevented from oozing from the slot 26 and the handle from becoming displaced, the side walls of the clamp-closure closely fit the side walls of the slot 26, the tolerance being only sufficient to permit relative movements between the faces.

Thus the shell 18 will have, in effect, a continuous wall from which the soap may not ooze.

While this is important in the making of all cast soap cakes, it is particularly important in connection with the making of transparent soap cakes because of the fact that, within the peripheral skin of the blank, the soap will be in a somewhat gelantinous or flowable condition for some considerable time after the cutting of the blanks from the slabs and the formation of the skin.

While I have illustrated and described a particular form of die and the steps of using it, it is to be understood in the art that certain changes may be made therein without departing from the spirit of the invention or the scope of the claims and so I do not wish to be limited in my coverage except as is made necessary by the appended claims.

What I claim is:

1. In a device for forming a compressed soap cake with a handle embedded therein and extending from the center portion of a face of said soap cake adjacent to said handle, a die piece including a shell having side walls and a first die member in said shell, one of said walls of said shell having a slot extending therethrough for receiving a soap cake handle, a second die member complemental to said first die member, said first die member being adjustable in said shell to adjust the die face thereof with respect to the die face of said second die member, whereby compressed soap cakes of various thicknesses can be formed, a clamp-closure carried by said second die member and movable within said slot to clamp said handle to said shell on movement of said second die member into said shell, said clamp-closure being dimensioned substantially to close said slot while clamping said handle.

2. The combination of elements recited in claim 1, wherein the clamp-closure is provided with means engageable with the sides of said soap-cake handle for centering said handle transversely in said slot.

3. The combination of elements recited in claim 1, wherein said clamp-closure is provided with an extension forming a portion of the die face of said second mentioned die member, whereby accumulation of soap between said face and said clamp-closure is obviated.

4. The combination of elements recited in claim 1, wherein said clamp-closure is detachable from said second mentioned die member.

5. The combination of elements recited in claim 1, wherein the clamping face of said clamp-closure is provided with a depression for receiving that portion of the soap-cake handle which is within the slot during application of pressure by said clamp-closure.

6. The combination of elements recited in claim 5, wherein said depression is substantially less than the thickness of the handle, whereby to clamp said handle to the bottom of the slot during compression of the soap cake.

7. The combination of elements recited in claim 5, wherein the clamp-closure is provided with means engageable with the sides of a soap-cake handle for centering the latter transversely in said slot.

References Cited

UNITED STATES PATENTS

| | | | |
|---|---|---|---|
| 394,107 | 12/1888 | Estabrook | 18—36 |
| 434,031 | 8/1890 | Ostrom | 25—7 |
| 2,256,769 | 9/1941 | Amrine | 18—36 |
| 2,338,524 | 1/1944 | McCabe. | |

WILLIAM J. STEPHENSON, *Primary Examiner.*

U.S. Cl. X.R.

18—36; 249—97